Patented June 6, 1950

2,510,063

UNITED STATES PATENT OFFICE 2,510,063

CORROSION INHIBITOR

Edward A. Bried, Newport, Del., assignor to Hercules Powder Company, Wilmington, Del., a corporation of Delaware No Drawing. Application July 20, 1948, Serial No. 39,801

11 Claims. (Cl. 252—148)

This invention relates to corrosion inhibitors and more particularly to corrosion inhibitors for aqueous solutions which normally corrode metals.

Inhibitors of corrosion which act by virtue of their ability to form a protective film on the surfaces of metals and thereby interfere with attack of corrosive materials are well known. Some such materials are effective in slightly acid solutions and some are effective in slightly alkaline solutions. Versatile inhibitors, especially those which are available in unlimited amounts at reasonable cost, are less well known. Moreover, inhibitors which are strongly adsorbed to metal surfaces and are soluble or readily dispersible in the colloidal state in water but less so or not at all in oils are in great demand.

Now in accordance with this invention it has been found that aqueous compositions normally corrosive to metal surfaces are inhibited toward corrosion of such metal surfaces when they contain dissolved or dispersed therein in small amounts a glycol ether of an ethanol rosin amine having the general formula

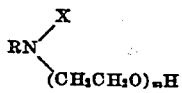

where R is a radical selected from the group consisting of abietyl, hydroabietyl, and dehydroabietyl, X is a radical selected from the group consisting of hydrogen and —$(CH_2CH_2O)_nH$, and $m$ and $n$ are integers from 2 to 10, the sum of which is within the range of about 4 to 20. Such compositions containing the glycol ethers of ethanol rosin amines of this invention as the corrosion inhibiting agent are effective in compositions having a wide range of pH from strongly acid to mildly alkaline, and in aqueous compositions which come in contact with oils.

The following examples are illustrative of the corrosion inhibited compositions of this invention.

Example I

Distilled water having a pH of about 6.5 and normally corrosive to steel was inhibited in its corrosive action by adding thereto 1% by weight of a glycol ether of dehydrogenated rosin amine of the above general formula wherein R corresponds chiefly to the dehydroabietyl radical and the sum of $m$ and $n$ equals in one instance 12 (Example IB) and in another instance 18 (Example IC). A freshly polished low carbon steel plate (2½ inch square) was added to each of the inhibited solutions and in one instance to a sample of distilled water used for making the inhibited solutions to serve as a blank. The steel plates were kept immersed at a depth of 1 inch in each of the solutions for a period of 30 days at 25° C. in covered glass containers. At the end of the test period the steel plates were removed, wiped gently with a soft cloth, rinsed with water and then with benzene and finally dried and weighed. The data showing the effectiveness of the glycol ethers of ethanol dehydrogenated rosin amines as corrosion inhibitors based upon the loss in weight of the steel plates due to corrosion are tabulated below:

| Example | Weight of Steel Plates | | Loss | Corrosion (Per cent of Blank) |
|---|---|---|---|---|
| | Before | After | | |
| IA (Blank) | 31.3014 | 31.1291 | 0.1723 | 100 |
| IB | 31.6487 | 31.6010 | 0.0477 | 28 |
| IC | 31.2982 | 31.2378 | 0.0604 | 35 |

Example II

Tests similar to those of Example I were carried out with 1% distilled water solutions of glycol ethers of ethanol dehydrogenated rosin amine of the same general formula in which the sum of $m$ and $n$ equals 4 in one instance and 8 in another instance. The inhibited solutions were acidified with a few drops of acetic acid in each case. In all of these tests corrosion below the water line was much less for the inhibited solutions than for the blank but corrosion above the water line was greater for the inhibited solutions due to vaporized acetic acid condensing on the plates out of the zone of activity of the inhibitor.

Example III

Tests were made on the corrosion of low carbon steel plates in inhibited and in uninhibited 15% hydrochloric acid solutions at room temperature (about 72° F.) for 4 days and also at 165° F. for 4 hours. The technique of carrying out the tests was similar to that of Example I. The inhibitors were the glycol ethers of ethanol dehydrogenated rosin amine of the general formula given above where the sum of $m$ and $n$ is 4 in one instance (IIIB) and 12 in another instance (IIIC). The data on the amount of corrosion of the 15% hydrochloric acid solutions containing 0.1% and 0.2% of the inhibitor in comparison with the amount of corrosion of uninhibited hydrochloric acid are tabulated below where the results are based upon the loss in weight of freshly polished low carbon steel plates.

[Four days at about 75° F.]

| Inhibitor | Per Cent Inhibitor | Weight Loss of Plates | Calculated Corrosion (Inches Per Year) |
| --- | --- | --- | --- |
| None | | 17.8563 | 1.00 |
| IIIB | 0.2 | 0.1031 | 0.006 |
| IIIC | 0.2 | 0.0876 | 0.005 |

[Four hours at about 165° F.]

| Inhibitor | Percent Inhibitor | Weight Loss of Plates | Percent Corrosion inhibition |
| --- | --- | --- | --- |
| None | | 22.8328 | 0 |
| IIIB | 0.1 | 0.3258 | 98.6 |
| IIIC | 0.1 | 0.2095 | 99.1 |

The above tests were repeated using 0.2% inhibitor with substantially the same amount of corrosion inhibition based on the corrosion of the blank.

Example IV

Tests similar to those of Example III were carried out using various glycol ethers of ethanol rosin amines of the general formula where R is abietyl, hydroabietyl, and dehydroabietyl and the sum of $m$ and $n$ is 4, 8, 12, and 18 as inhibitors in the various tests. The concentration of inhibitor in the 15% hydrochloric acid used in the tests was varied from 0.05 to 0.2 based on the weight of the acid solution. Tests were carried out at 72° F. for 4 days and at 165° F. for 4 hours in comparison with uninhibited hydrochloric acid solutions as blanks. In all of these tests the per cent inhibition of the hydrochloric acid based on comparative corrosion of low carbon steel plates by inhibited and uninhibited 15% hydrochloric acid solutions was in the range of 80.6% to 99.5%.

Example V

An aqueous solution containing 10% sulfuric acid and 10% ferrous sulfate was prepared and 100-gram portions were placed in three beakers. One sample was retained as a blank. To one of the solutions was added 0.1 gram glycol ether of ethanol dehydrogenated rosin amine of the general formula where the sum of $m$ and $n$ equals 4 (VB). To the third sample was added 0.1 gram glycol ether of ethanol dehydrogenated rosin amine of the general formula where the sum of $m$ and $n$ equals 12 (VC). The solutions in the beakers were then heated in an oil bath to 215° F. and small steel strips of equal weight and surface area which had been previously polished and weighed were placed in the various beakers. It was noted that those solutions containing the inhibitor formed a protective foam on the surface which retarded liberation of acid fumes. After the steel strips had been allowed to pickle for 1 hour in the solutions, they were removed, rinsed with water, and wiped dry and weighed. The per cent corrosion of the steel strips based upon the loss in weight in comparison with the loss in weight with the strips in the uninhibited solution was as follows:

| Solution | Per cent Corrosion |
| --- | --- |
| Blank (No inhibitor) | 100 |
| VB | 18 |
| VC | 13 |

These data indicate the effectiveness of the corrosion inhibitors of this invention in reducing the amount of corrosion of iron in pickling baths. These tests also show the value of the inhibitors of this invention in their ability to form protective blankets which retard the liberation of acid fumes. It was also observed that pickling baths containing the inhibitors of this invention have a pronounced wetting action and readily wet steel panels even though coated with a fine film of oil.

Example VI

Brine solutions were made up by adding 1 part of glycol ether of ethanol dehydrogenated rosin amine of the above general formula where the sum of $m$ and $n$ equals 12 to 100 parts brine solution. In one instance the brine solution was a 20% sodium chloride solution and in another instance it was a 20% mixed calcium chloride-magnesium chloride (1:1 by weight) brine. Both inhibited brine solutions were tested for corrosion of cast iron pipe at 25° C. The brines containing the inhibitor showed considerably less corrosion of the iron pipe than those containing no inhibitor. The difference, while noticeable in one day, was much more outstanding thereafter.

Example VII

Comparative tests of the glycol ether of monoethanol dehydrogenated rosin amine with the glycol ether of diethanol dehydrogenated rosin amine both having about 6($CH_2CH_2O$) units per molecules, the former in one chain and the latter in two chains, made following the procedure of Example III showed both types of compositions of this invention to be substantially equivalent as inhibitors for 15% hydrochloric acid solutions. The glycol ether of diethanol dehydrogenated rosin amine was shown to have the advantage of being more readily dispersible in aqueous solutions and of being extractable by oils to a much less degree.

Glycol ethers of ethanol rosin amines of the general formula given above where R is abietyl, hydroabietyl, and dehydroabietyl have all been shown to have pronounced corrosion inhibiting properties.

The glycol ethers of ethanol rosin amines of this invention are produced by reacting a rosin amine with ethylene oxide. The initial product is believed to be ethanol rosin amines having the formulas

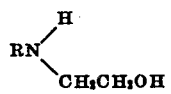

and

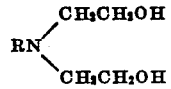

where R is the organic radical of the rosin amine. The products of this invention are the products of further reaction with ethylene oxide in which the alcohol groups of the initial product react with the formation of ether linkages. Thus, the product of reaction of rosin amine with four moles of ethylene oxide is a substance of the general formula

where X is a radical selected from the group consisting of hydrogen and $-(CH_2CH_2O)_nH$ where the sum of $m$ and $n$ equals 4. The product may contain both the glycol ether of monoethanol rosin amine and the glycol ether of diethanol rosin amine, the total number of $-(CH_2CH_2O)-$ units being equal to the number of moles of ethylene oxide added whether such units are attached to the nitrogen as a single chain or as two chains. In these formulas where R is the organic radical of a rosin amine, it is intended that the radical shall include the abietyl radical, the dihydroabietyl radical, the tetrahydroabietyl radical and the dehydroabietyl radical.

The reaction of rosin amine with ethylene oxide for the production of the inhibitors of this invention is generally carried out by heating rosin amine with 1% of its weight of sodium methoxide to about 150° C. and adding the desired weight of ethylene oxide gas gradually until the desired absorption is obtained. Products prepared in this manner contain a high percentage of glycol ethers of the type in which one hydrogen remains on the nitrogen and the

$-(CH_2CH_2O)-$ units are attached to the nitrogen as a single chain.

The glycol ethers of diethanol rosin amine which have two glycol ether chains may be prepared free of glycol ethers of monoethanol rosin amines by reacting a rosin amine with ethylene oxide in the absence of a catalyst to produce as an initial product diethanol rosin amine and subsequently adding a catalyst and continuing the reaction of the diethanol rosin amine with ethylene oxide. The first reaction in the absence of the catalyst is preferably carried out in alcoholic solution at atmospheric pressure and the second reaction in the presence of a catalyst is carried out in the absence of alcoholic solvents. The usual catalyst for the condensation of ethylene oxide with alcoholic hydroxyls include sodium hydroxide and sodium alkoxides such as the methoxide, ethoxide, propoxide, etc., and the corresponding potassium compounds.

The rosin amines from which the glycol ethers of the ethanol rosin amines of this invention are prepared are the rosin amines which are prepared by reacting ammonia with a natural rosin or a modified rosin to form the nitrile from the carboxyl group in the rosin and then hydrogenating the rosin nitrile or modified rosin nitrile to form the amine. The preparation of the nitrile may be carried out by passing gaseous ammonia into the molten rosin material and vaporizing the water as fast as it is formed in order to remove the water from the reaction mixture. Dehydration catalysts may be used to facilitate the reaction with ammonia, if desired. The nitrile is preferably purified by neutralization or distillation to make it suitable for hydrogenation to the amine as the presence of acidic materials frequently destroys the hydrogenation catalyst. The nitrile may be formed from any natural rosin or modified rosin such as gum rosin, wood rosin, hydrogenated rosin, dehydrogenated or disproportionated rosin, or heat-treated rosin. The rosin nitriles may likewise be made from the rosin acids which are major constituents of these rosins such as abietic acid, dihydroabietic acid, dehydroabietic acid, and tetrahydroabietic acid.

The resin acid nitriles prepared from the natural or modified rosins or the corresponding rosin acids are readily hydrogenated to the amines. The hydrogenation is usually carried out by heating the rosin nitrile at about 150° to 200° C. with a Raney nickel catalyst under hydrogen pressure up to about 8000 lb./sq. in. The hydrogenation may also be carried out using other catalysts such as Raney cobalt supported nickel or cobalt catalysts and noble metal catalysts such as platinum, palladium, palladium on carbon, or reduced platinum oxide. The reaction may be carried out under hydrogen pressure of from about 200 to 8000 lb./sq. in. and at a temperature of from about 20° C. to about 200° C. Solvents may be used if desired and are preferable at the lower temperatures. The hydrogenation may also be carried out in the presence or absence of ammonia. Although the hydrogenation is ordinarily carried out only to the extent of hydrogenation of the nitrile group which hydrogenates quite readily, the hydrogenation may also be carried out under such conditions of temperature, pressure, and time of hydrogenation as to hydrogenate the rosin amines which are produced to convert them to hydrorosin amines which correspond to the amines produced from hydrogenated rosin via the nitriles.

For convenience of expression in this specification, the abietyl, hydroabietyl, and dehydroabietyl radicals are referred to with the intention that they be considered broadly as covering rosin materials containing those radicals as major constituents. Thus, the products derived from rosin are considered to have the abietyl radical as a major constituent, the products derived from hydrogenated rosin are considered to have hydroabietyl radicals as the major constituent, and dehydrogenated rosin is considered to have dehydroabietyl radicals as the major constituent. Abietyl amine is thus considered synonymous with rosin amine, hydroabietyl amine is considered synonymous with hydrogenated rosin amine, and dehydroabietyl amine is considered synonymous with dehydrogenated rosin amine. It is not intended, however, to exclude the possibility of minor amounts of each of the various rosin amines in any of the rosin amines referred to by specific chemical names.

The glycol ethers of ethanol rosin amines of this invention may be used as corrosion inhibitors in either the dissolved or dispersed state in aqueous solutions. They are more soluble in the aqueous than in the oil phase of two phase systems. When compounds of the general formula given above, wherein the sum of $m$ and $n$ equals about 8 to 20, are used, they dissolve or disperse readily in aqueous solutions without producing any cloudiness and they may be used in acid, neutral or basic solutions. Compounds of the general formula in which the sum of $m$ and $n$ equals 4 to about 8 dissolve or disperse in neutral or alkaline solutions with the production of hazy solutions indicating a finely divided collodial condition rather than true solution. Such collodial solutions, nevertheless, are effectively inhibited against corrosion. In strongly acid solution these same compounds form clear solutions.

The glycol ethers of ethanol rosin amines of this invention are insoluble in hydrocarbons. They find utility as corrosion inhibitors for hydrocarbons or hydrocarbon solutions containing dispersed acidic or basic aqueous phase. For example, they find utility in preventing corrosion of iron due to alkaline water dispersed in caustic-treated petroleum products. The corrosion inhibitors of this invention when used for treating such petroleum products greatly decrease the corrosion of these products on pipe lines through which they are passed.

The amount of glycol ethers of ethanol rosin amines used for corrosion inhibitors in aqueous compositions is ordinarily based upon the weight of aqueous composition to be treated. Noticeable corrosion inhibition is brought about by the incorporation of very small amounts of the inhibitor. As little as 0.0001% inhibitor may be used, for example. Ordinarily less than 1% inhibitor will be used, the amount depending largely upon the nature of the aqueous composition and the uses to which it is put.

Aqueous compositions in which the glycol ethers of ethanol rosin amines may be used as corrosion inhibitors include distilled water, tap water, boiler water, water used in automobile radiators with or without alcohols, glycols, and other freezing point depressants used in automobile radiators, unsaturated hydrochloric acid solutions used for oil well acidizing and descaling of metals, strong sulfuric acid solutions used for pickling baths, aqueous brine solutions containing sodium chloride, mixed calcium chloride-magnesium chloride and similar brines used for refrigeration purposes, whether or not containing ammonia, and caustic solutions such as those containing sodium hydroxide, sodium bicarbonate, sodium carbonate, and the like.

The glycol ethers of ethanol dehydrogenated rosin amines derived from dehydrogenated or disproportionated rosin or dehydrogenated or disproportionated abietic acid have been found to be more satisfactory than the corrosion inhibitors derived from the other rosin acids because of their greater stability when used, for example, in inhibited acid solutions.

What I claim and desire to protect by Letters Patent is:

1. A corrosion inhibited aqueous composition comprising an aqueous solution in which the corrosive component is a material of the group consisting of brine and mineral acid containing dissolved therein in small amounts sufficient to inhibit corrosion of metal surfaces by said solution a glycol ether of an ethanol rosin amine having the general formula

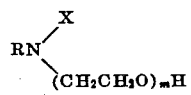

where R is a radical selected from the group consisting of abietyl, hydroabietyl, and dehydroabietyl, X is a radical selected from the group consisting of hydrogen and —(CH$_2$CH$_2$O)$_n$H, and $m$ and $n$ are integers from 2 to 10, the sum of which is within the range of about 4 to 20.

2. A corrosion inhibited aqueous composition comprising an aqueous brine solution normally corrosive toward metal surfaces containing dissolved therein in small amounts sufficient to inhibit corrosion of metal surfaces by said solution a glycol ether of an ethanol rosin amine having the general formula

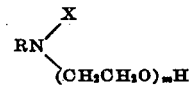

where R is a radical selected from the group consisting of abietyl, hydroabietyl, and dehydroabietyl, X is a radical selected from the group consisting of hydrogen and —(CH$_2$CH$_2$O)$_n$H, and $m$ and $n$ are integers from 2 to 10, the sum of which is within the range of about 4 to 20.

3. A corrosion inhibited aqueous composition comprising an aqueous mineral acid solution normally corrosive toward metal surfaces containing dissolved therein in small amounts sufficient to inhibit corrosion of metal surfaces by said solution a glycol ether of an ethanol rosin amine having the general formula

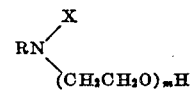

where R is a radical selected from the group consisting of abietyl, hydroabietyl, and dehydroabietyl, X is a radical selected from the group consisting of hydrogen and —(CH$_2$CH$_2$O)$_n$H, and $m$ and $n$ are integers from 2 to 10, the sum of which is within the range of about 4 to 20.

4. A corrosion inhibited aqueous composition comprising an aqueous mineral acid solution normally corrosive toward metal surfaces containing dissolved therein in small amounts sufficient to inhibit corrosion of metal surfaces by said solution a glycol ether of an ethanol rosin amine having the general formula

where R is the dehydroabietyl radical, X is a radical selected from the group consistinf of hydrogen and —(CH$_2$CH$_2$O)$_n$H, and $m$ and $n$ are integers from 2 to 10, the sum of which is within the range of about 4 to 20.

5. A corrosion inhibited aqueous composition comprising an aqueous brine solution normally corrosive toward metal surfaces containing dissolved therein in small amounts sufficient to inhibit corrosion of metal surfaces by said solution a glycol ether of an ethanol rosin amine having the general formula

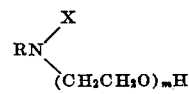

where R is the dehydroabietyl radical, X is a radical selected from the group consisting of hydrogen and —(CH$_2$CH$_2$O)$_n$H, and $m$ and $n$ are integers from 2 to 10, the sum of which is within the range of about 4 to 20.

6. A corrosion inhibited aqueous composition comprising an aqueous solution in which the corrosive component is a material of the group consisting of brine and mineral acid containing dissolved therein in small amourts sufficient to inhibit corrosion of metal surfaces by said solution a glycol ether of an ethanol rosin amine having the general formula

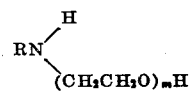

where R is a radical selected from the group consisting of abietyl, hydroabietyl, and dehydroabietyl, and $m$ in an integer from 4 to 20.

7. A corrosion inhibited aqueous composition comprising an aqueous solution in which the corrosive component is a material of the group consisting of brine and mineral acid containing dissolved therein in small amounts sufficient to inhibit corrosion of metal surfaces by said solution a glycol ether of a diethanol rosin amine having the general formula

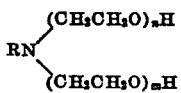

where $R$ is a radical selected from the group consisting of abietyl, hydroabietyl, and dehydroabietyl, and $m$ and $n$ are integers from 2 to 10.

8. A corrosion inhibited aqueous composition comprising an aqueous solution in which the corrosive component is a material of the group consisting of brine and mineral acid containing dissolved therein in small amounts sufficient to inhibit corrosion of metal surfaces by said solution a glycol ether of an ethanol rosin amine having the general formula

where $R$ is the dehydroabietyl radical and $m$ is an integer from 4 to 20.

9. A corrosion inhibited aqueous composition comprising an aqueous mineral acid solution normally corrosive toward metal surfaces containing dissolved therein in small amounts sufficient to inhibit corrosion of metal surfaces by said solution a glycol ether and an ethanol rosin amine having the general formula.

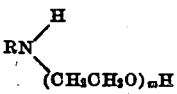

where $R$ is the dehydroabietyl radical and $m$ is an integer from 4 to 20.

10. A method of inhibiting the corrosion of metal surfaces in contact with an aqueous solution normally corrosive toward said metal surfaces which comprises dissolving therein in small amounts sufficient to inhibit the corrosion of said metal surfaces a glycol ether of an ethanol rosin amine having the general formula

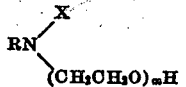

where $R$ is a radical selected from the group consisting of abietyl, hydroabietyl, and dehydroabietyl, $X$ is a radical selected from the group consisting of hydrogen and $—(CH_2CH_2O)_nH$, and $m$ and $n$ are integers from 2 to 10, the sum of which is within the range of about 4 to 20.

11. A method of inhibiting the corrosion of metal surfaces in contact with an aqueous solution normally corrosive toward said metal surfaces which comprises dissolving therein in small amounts sufficient to inhibit the corrosion of said metal surfaces a glycol ether of an ethanol rosin amine having the general formula

where $R$ is the dehydroabietyl radical, $X$ is a radical selected from the group consisting of hydrogen and $—(CH_2CH_2O)_nH$, and $m$ and $n$ are integers from 2 to 10, the sum of which is within the range of about 4 to 20.

EDWARD A. BRIED.

REFERENCES CITED

The following references are of record in the file of this patent:

UNITED STATES PATENTS

| Number | Name | Date |
|---|---|---|
| 2,194,429 | Krzikalla et al. | Mar. 19, 1940 |
| 2,384,467 | Hill | Sept. 11, 1945 |